US012548086B2

(12) United States Patent
Mehra et al.

(10) Patent No.: US 12,548,086 B2
(45) Date of Patent: Feb. 10, 2026

(54) AUTOMATIC POLICY TERM ADJUSTMENT BASED ON ADVANCE RENEWAL NOTICE

(71) Applicant: State Farm Mutual Automobile Insurance Company, Bloomington, IL (US)

(72) Inventors: Kunal Mehra, Bloomngton, IL (US); Mounika Chinthapenta, Atlanta, GA (US); Aanandhi Priyadharshini Manoharan, Gaithersburg, MD (US); Harishankar Thodupunoori, Prosper, TX (US); Ross Sikyta, Normal, IL (US); Pavan Kumar Sharma, Bloomington, IL (US); Brett Michael Whitehead, Heyworth, IL (US)

(73) Assignee: State Farm Mutual Automobile Insurance Company, Bloomington, IL (US)

( * ) Notice: Subject to any disclaimer, the term of this patent is extended or adjusted under 35 U.S.C. 154(b) by 24 days.

(21) Appl. No.: 18/416,317

(22) Filed: Jan. 18, 2024

(65) Prior Publication Data

US 2025/0238872 A1  Jul. 24, 2025

(51) Int. Cl.
*G06Q 40/08* (2012.01)
(52) U.S. Cl.
CPC ........... *G06Q 40/086* (2025.08); *G06Q 40/08* (2013.01)

(58) Field of Classification Search
CPC .............................. G06Q 40/08; G06Q 40/086
See application file for complete search history.

(56) References Cited

U.S. PATENT DOCUMENTS

| 8,346,579 | B1 | 1/2013 | Solis et al. |
| 2006/0184387 | A1 | 8/2006 | Richardson et al. |
| 2013/0073318 | A1* | 3/2013 | Feldman ................. G06Q 40/08 705/4 |
| 2015/0012304 | A1 | 1/2015 | Rao |
| 2022/0296930 | A1* | 9/2022 | Chen .................... A61N 5/1045 |
| 2024/0161914 | A1* | 5/2024 | Godfrey ............. G06Q 10/0631 |

* cited by examiner

*Primary Examiner* — Scott C Anderson
(74) *Attorney, Agent, or Firm* — Lee & Hayes, P.C.

(57) ABSTRACT

A renewal adjustor may determine that an advance renewal notice, associated with an upcoming renewal of an insurance policy that involves a premium increase, was not sent by a target notice date determined based on an applicable advance renewal notice period. The renewal adjuster may automatically edit policy data, maintained by a policy management system in association with the insurance policy, to extend a current term of the insurance policy by a length of time by which the advance renewal notice was delayed and to shorten a subsequent renewal term of the insurance policy by the same length of time. Accordingly, by editing the policy data to extend the current term and shorten the renewal term, a renewal of the insurance policy by the policy management system may be delayed until the advance renewal notice period elapses following the actual date the advance renewal notice was sent.

20 Claims, 5 Drawing Sheets

200

| Current Term 112 | January 1 – June 30 |
|---|---|
| Current Premium 120 | $100 per month |
| Renewal Term 114 | July 1 – December 31 |
| Renewal Premium 122 | $125 per month |

104

| Current Term 112 | January 1 – July 20 |
|---|---|
| Current Premium 120 | $100 per month |
| Renewal Term 114 | July 21 – December 31 |
| Renewal Premium 122 | $125 per month |

104

300

142

| Time Period | June 1 – June 30 |
|---|---|
| Renewals Performed | 105,215 |
| Renewals Subject to Advance Renewal Notice Periods | 30,713 |
| Late Advance Renewal Notices | 2752 |
| Late Advance Renewal Notices – Policyholder Reason | 1935 |
| Late Advance Renewal Notices – Insurer Reason | 817 |
| Automatically Delayed Renewals | 795 |

FIG. 3

AUTOMATIC POLICY TERM ADJUSTMENT BASED ON ADVANCE RENEWAL NOTICE

TECHNICAL FIELD

The present disclosure relates to renewals of insurance policies, particularly with respect to automatically adjusting terms of insurance policies based on detection of late advance renewal notices associated with renewals of the insurance policies.

BACKGROUND

When an insurance policy is set to be renewed by an insurance company, the insurance company may send an advance renewal notice to a policyholder associated with the insurance policy. Some states or other jurisdictions may permit the insurance company to increase a premium of the insurance policy, in association with the renewal, after an advance renewal notice period has passed following the date the advance renewal notice is sent.

As an example, a 45-day advance renewal notice period may apply to an insurance policy that is set to be renewed by an insurance company. In this example, the insurance company may increase the premium of the insurance policy, in association with the renewal, if at least 45 days have passed after the insurance company sent an advance renewal notice to a policyholder associated with the insurance policy.

In some situations, an insurance company may send an advance renewal notice, associated with an insurance policy, far enough in advance of a scheduled renewal date that the advance renewal notice period elapses on or before the scheduled renewal date. Accordingly, in such situations in which the advance renewal notice period elapses by the scheduled renewal date, the insurance company may increase the premium associated with the insurance policy when the insurance policy is renewed on the scheduled renewal date.

However, in other situations, an advance renewal notice may be delayed. For instance, a technical error, human error, or another issue may cause an advance renewal notice associated with an upcoming renewal of an insurance policy to be sent later than it should have been. In these situations, the advance renewal notice period may not elapse, following the date the delayed advance renewal notice is sent, until after a scheduled renewal date of the insurance policy.

It may be difficult for an insurance company to track information associated with advance renewal notices and corresponding renewals of insurance policies. For example, an insurance company may manage hundreds of thousands, or even millions, of insurance policies across many different jurisdictions, and different jurisdictions may have different advance renewal notice periods. It may accordingly be difficult to track whether advance renewal notice periods apply to individual insurance policies, to track whether advance renewal notices have been sent early enough to comply with corresponding advance renewal notice periods for individual insurance policies, and/or whether premium increases can go into effect on scheduled renewal dates for individual insurance policies.

Moreover, in situations in which advance renewal notices for insurance policies are sent late, it may be difficult to ensure that premium increases do not go into effect in association with renewals of the insurance policies until the corresponding advance renewal notice periods have elapsed. As an example, in some conventional systems a premium rate table associated with a renewed insurance policy may be manually adjusted to keep a pre-renewal value of the insurance policy's premium in effect until a date, after the renewal date, when the advance renewal notice period has elapsed or will elapse. As another example, in other conventional systems a premium rate table associated with a renewed insurance policy may be manually adjusted to decrease and/or pro-rate a daily premium value, across the entire term of the renewed insurance policy, to account for a number of days between the renewal date and a later date at the end of the advance renewal notice period when a planned increase in the premium may take effect. Manually adjusting such premium rate tables in association with late advance renewal notices may be difficult and/or inefficient, particularly if there are hundreds of thousands, or even millions, of insurance policies that may be at risk of being associated with late advance renewal notices and that may accordingly need manual adjustments. Manually adjusting such premium rate tables may also introduce the risk of human error, such as if the premium rate tables are incorrectly modified.

Additionally, some computer-implemented policy management systems may have technical barriers that prevent users from adjusting premium rate tables associated with insurance policies during terms of the insurance policies. For example, a premium rate table associated with an insurance policy may be locked in a database by a policy management system during a corresponding term of the insurance policy. Accordingly, such policy management systems may block users, at a technical level, from editing the premium rate table to account for a period of time following a renewal of the insurance policy that should be associated with a lower premium value until a date when an advance renewal notice period expires and a higher premium value may take effect.

The example systems and methods described herein may be directed toward mitigating or overcoming one or more of the deficiencies described above.

SUMMARY

Described herein are systems and methods by which a computer-implemented renewal adjustor may detect when an advance renewal notice associated with an upcoming renewal of an insurance policy has not been sent by a target notice date that precedes a scheduled renewal date by an advance renewal notice period. If the renewal adjustor detects such that an advance renewal notice was sent late, on an actual notice date that was after the target notice date by a particular notice delay period, the renewal adjustor may edit policy data stored by a policy management system to extend a current term of the insurance policy by the notice delay period and to shorten a subsequent renewal term of the insurance policy. The adjustment of the policy data by the renewal adjustor may effectively reschedule the renewal of the insurance policy until after the extended current term of the insurance policy, such that a premium increase associated with the renewal of the insurance policy does not take effect until the advance renewal notice period has elapsed following the actual notice date when the advance renewal notice was sent. Accordingly, instead of editing premium information associated with the insurance policy after the renewal to change premium values associated with the renewed term of the insurance policy due to the late advance renewal notice, the renewal adjustor may automatically modify policy data to extend the current term and shorten the renewal term without modifying premium information associated with the insurance policy.

According to a first aspect, a computer-implemented method includes accessing, by a computing system including a processor, a data repository associated with a policy management system. The data repository stores policy data associated with policies. The policy management system is configured to block modification of premium information, in the policy data, associated with the policies during terms of the policies. The computer-implemented method also includes identifying, by the computing system, and based on the policy data, a policy that is scheduled for renewal. The computer-implemented method additionally includes determining, by the computing system, and based on the policy data, that an advance renewal notice associated with the policy was sent late, after a target date, by a particular number of days. The computer-implemented method further includes modifying, by the computing system, the policy data to extend a current term of the policy by the particular number of days. The computer-implemented method also includes modifying, by the computing system, the policy data to shorten a renewal term of the policy by the particular number of days. The modification of the policy data causes the policy management system to delay the renewal of the policy by the particular number of days.

According to a second aspect, a computing system includes one or more processors and memory. The memory stores computer-executable instructions associated with a renewal adjustor that, when executed by the one or more processors, cause the one or more processors to access a data repository associated with a policy management system. The data repository stores policy data associated with policies. The policy management system is configured to block modification of premium information, in the policy data, associated with the policies during terms of the policies. The computer-executable instructions also cause the one or more processors to identify, based on the policy data, a policy that is scheduled for renewal. The computer-executable instructions additionally cause the one or more processors to determine that an advance notice period applies to the policy. The computer-executable instructions further cause the one or more processors to determine, based on the advance notice period and an end date of a current term of the policy indicated by the policy data, a target date. The computer-executable instructions also cause the one or more processors to determine, based on the policy data, that an advance renewal notice associated with the policy was sent late, after the target date, by a particular number of days. The computer-executable instructions additionally cause the one or more processors to modify the policy data to extend the current term of the policy by the particular number of days. The computer-executable instructions also cause the one or more processors to modify the policy data to shorten a renewal term of the policy by the particular number of days. The modification of the policy data causes the policy management system to delay the renewal of the policy by the particular number of days.

According to a third aspect, one or more non-transitory computer-readable media stores computer-executable instructions associated with a renewal adjustor. The computer-executable instructions, when executed by one or more processors of a computing system, cause the one or more processors to access a data repository associated with a policy management system. The data repository stores policy data associated with policies. The policy management system is configured to block modification of premium information, in the policy data, associated with the policies during terms of the policies. The computer-executable instructions also cause the one or more processors to identify, based on the policy data, a policy that is scheduled for renewal. The computer-executable instructions additionally cause the one or more processors to determine that an advance notice period applies to the policy. The computer-executable instructions further cause the one or more processors to determine, based on the advance notice period and an end date of a current term of the policy indicated by the policy data, a target date. The computer-executable instructions also cause the one or more processors to determine, based on the policy data, that an advance renewal notice associated with the policy was sent late, after the target date, by a particular number of days. The computer-executable instructions additionally cause the one or more processors to modify the policy data to extend the current term of the policy by the particular number of days. The computer-executable instructions also cause the one or more processors to modify the policy data to shorten a renewal term of the policy by the particular number of days. The modification of the policy data causes the policy management system to delay the renewal of the policy by the particular number of days.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items or features.

FIG. 3 shows an example of a dashboard of the renewal adjustor.

DETAILED DESCRIPTION

Figure 1:
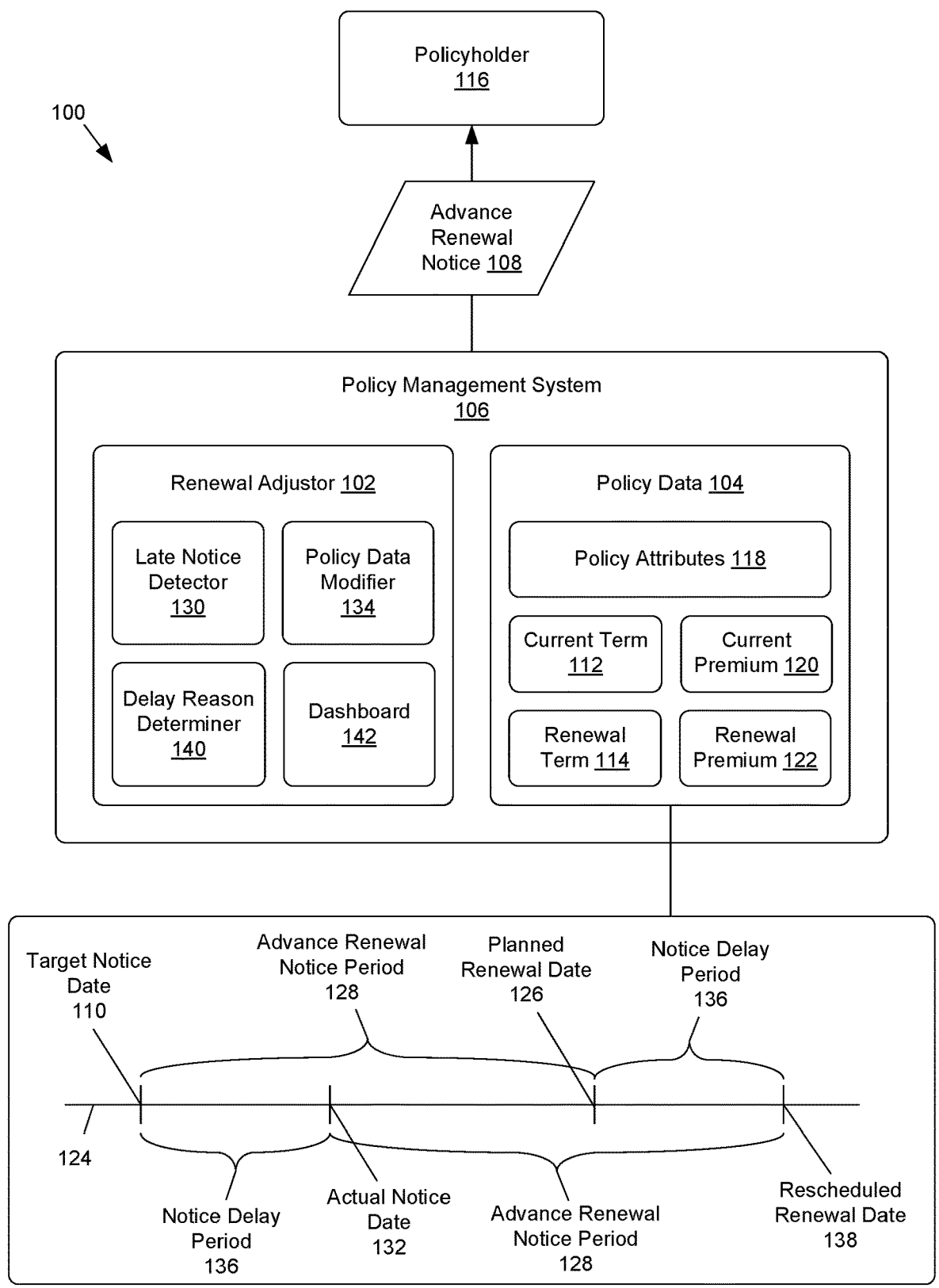
FIG. 1 shows an example of a renewal adjustor configured to automatically adjust policy data, corresponding with insurance policies, in association with renewals of the insurance policies.

FIG. 1 shows an example 100 of a renewal adjustor 102 configured to automatically adjust policy data 104, corresponding with insurance policies, in association with renewals of the insurance policies. The policy data 104 may be stored, maintained, and/or used by a policy management system 106. The renewal adjustor 102 may be a part of, and/or may interact with, the policy management system 106, such that the renewal adjustor 102 may access and/or edit the policy data 104. The renewal adjustor 102 may detect whether an advance renewal notice 108 associated with a renewal of an insurance policy was not sent by a corresponding target notice date 110. If the advance renewal notice 108 is not sent by the target notice date 110, the renewal adjustor 102 may, in some situations, automatically adjust the policy data 104 to extend a current term 112 of the insurance policy and to shorten a subsequent renewal term 114 associated with the renewal of the insurance policy.

Insurance policies may be provided by an insurance company, and may be associated with corresponding policyholders 116. The insurance policies may be vehicle insurance policies, home insurance policies, property insurance policies, life insurance policies, and/or other types of insurance policies. The insurance company, and users associated with the insurance company, may use the policy management system 106 to manage insurance policies provided to policyholders 116 by the insurance company.

The policy management system 106 may be a software application or other computer-implemented system that is configured to manage insurance policies based on the policy data 104. The policy management system 106 may store the policy data 104 in one or more databases or other data repositories. The policy management system 106 may add or create policy data 104 associated with new insurance policies, may edit policy data 104 associated with insurance policies, may perform operations to process policy data 104 associated with insurance policies, may provide other elements with access to, and/or copies of, policy data 104 associated with insurance policies, may have user interface elements that allow users to view and/or edit policy data 104 associated with insurance policies, and/or may otherwise manage policy data 104 associated with insurance policies.

The policy data 104 may indicate information about corresponding insurance policies. For example, policy data 104 associated with an insurance policy may include policy attributes 118 that indicate one or more types of information about the insurance policy. As an example, policy attributes 118 of a vehicle insurance policy may include one or more of: an identifier of the policyholder 116 associated with the vehicle insurance policy, contact information of the policyholder 116, a policy number, an agreement number, an insurance agent identifier, a vehicle identifier, mandatory coverage information, vehicle use information, driver exclusions, billing methods, billing account information, historical information associated with the insurance policy, and/or other types of information.

The policy data 104 associated with an insurance policy may also indicate the current term 112 defining a period of time associated with a current term of the insurance policy. As an example, the current term 112 may be a six-month period of time extending from January 1 to June 30. The policy data 104 associated with the insurance policy may also indicate a value of a current premium 120 associated with the insurance policy, such as a monthly premium to be paid by the policyholder 116 during the current term 112 of the insurance policy.

The policy data 104 associated with an insurance policy may also indicate the renewal term 114 defining a period of time associated with a future term of the insurance policy that is set to take effect upon the next renewal of the insurance policy. As an example, if the current term 112 is a six-month period of time extending from January 1 to June 30, the renewal term 114 may be a subsequent six-month period of time extending from July 1 to December 31.

The policy data 104 associated with the insurance policy may also indicate a value of a renewal premium 122 associated with the insurance policy, such as a monthly premium to be paid by the policyholder 116 after renewal of the insurance policy during the renewal term 114 of the insurance policy. In some examples, the renewal premium 122 may be the same as the current premium 120, such that premium paid by the policyholder 116 is not set to change when the insurance policy is renewed. However, in other examples in which the premium paid by the policyholder 116 is set to change when the insurance policy is renewed, the renewal premium 122 may be higher or lower than the current premium 120.

The policy management system 106, and/or another system or entity associated with an insurance company, may send an advance renewal notice 108 to a policyholder 116 in association with a renewal of a corresponding insurance policy. For example, the advance renewal notice 108 may explain that the insurance policy is scheduled to be renewed, indicate a scheduled date of the renewal, indicate a value of the renewal premium 122 that the insurance policy will be associated with after the renewal, and/or indicate any other information associated with the renewal of the insurance policy. The advance renewal notice 108 may be a physical letter sent via mail, an electronic message sent via e-mail, or another type of message or notification.

A timeline 124 of events associated with an insurance policy may be defined in, and/or may be derived or inferred from, policy data 104 associated with the insurance policy. As an example, a planned renewal date 126 on the timeline 124, at which the insurance policy is scheduled to renew, may derived based on the ending date of the current term 112 and/or the beginning date of the subsequent renewal term 114 indicated by the policy data 104.

As another example, a target notice date 110 associated with the insurance policy may be determined on the timeline 124 based on the planned renewal date 126 and an advance renewal notice period 128. The advance renewal notice period 128 may define a number of days, prior to a premium increase associated with renewal of an insurance policy, by which an advance renewal notice 108 associated with the insurance policy is to be sent. Accordingly, the target notice date 110 associated with the insurance policy may be determined to be a date that is the advance renewal notice period 128 prior to the planned renewal date 126 at the end of the current term 112 and/or at the beginning of the renewal term 114 associated with the insurance policy. The advance renewal notice period 128 may be set based on a law, rule, regulation, or other policy that is applicable to a state or other jurisdiction associated with the insurance policy.

For instance, a state law may set an advance renewal notice period 128 for a particular type of insurance policy. The state law may indicate that an advance renewal notice 108, associated with an insurance policy of the particular type, is to be sent by an insurance company to a corresponding policyholder 116 by a date that is a number of days, defined by the advance renewal notice period 128, prior to a premium increase associated with renewal of the insurance policy.

As an example, the current term 112 of an insurance policy may end on October 15, such that the insurance policy is scheduled to be renewed on a planned renewal date 126 of October 16 for a subsequent renewal term 114 that begins on October 16. The insurance policy may be held by a policyholder 116 located in a particular state, and that particular state may have a law that sets a 45-day advance renewal notice period 128. Accordingly, in this example, the target notice date 110 for the insurance policy may be September 1, 45 days prior to the planned renewal date 126 of October 16.

Some states or jurisdictions may have the same advance renewal notice period 128. However, other states or jurisdictions may have different advance renewal notice periods 128. Still other states or jurisdictions may not have advance renewal notice periods 128. As an example, a first state may have a 60-day advance renewal notice period 128, a second state may have a 30-day advance renewal notice period 128, and a third state may not have an advance renewal notice period 128. Accordingly, different insurance policies may or may not be associated with target notice dates 110 depending on whether corresponding jurisdictions have advance renewal notice periods 128. Additionally, different insurance policies associated with jurisdictions that do have advance renewal notice periods 128 may have different target notice dates 110 determined based on the planned renewal dates 126 of those insurance policies and the advance renewal notice periods 128 that are applicable to those insurance policies.

As a first example, two insurance policies may be associated with a jurisdiction that has a 30-day advance renewal notice period 128. Accordingly, the two insurance policies may have different target notice dates 110 that are each 30 days prior to respective different planned renewal dates 126 of the two insurance policies.

As a second example, two insurance policies may be set to renew on the same planned renewal date 126. However, the two insurance policies may be associated with different jurisdictions that have different advance renewal notice periods 128. Accordingly, although the two insurance policies are associated with the same planned renewal date 126, the two insurance policies may be associated with different target notice dates 110 that are different numbers of days prior to that planned renewal date 126, based on the differing advance renewal notice periods 128 that apply to the two different insurance policies.

In some examples, advance renewal notice periods 128 may be applicable to one or more types of insurance policies, but not other types of insurance policies. As an example, a state may set an advance renewal notice period 128 for vehicle insurance policies covering vehicles that are used for business purposes or other non-personal use, and for which the renewal premium 122 will exceed the current premium 120 by more than a threshold amount. Accordingly, the advance renewal notice period 128 may not apply to an insurance policy that covers a vehicle used for personal use. Similarly, the advance renewal notice period 128 may not apply to an insurance policy that covers a vehicle that is used for business purposes, if the renewal premium 122 is not set to be higher than the current premium 120 by more than the threshold amount.

If an advance renewal notice period 128 associated with a jurisdiction does apply to an insurance policy, a law, rule, regulation, or other policy of the jurisdiction may bar the insurance company from increasing the premium associated with the insurance policy from the current premium 120 to the renewal premium 122 until a date that is at least the advance renewal notice period 128 after the date that the insurance company sends the advance renewal notice 108. For instance, if a jurisdiction has a 30-day advance renewal notice period 128, and the insurance company sends an advance renewal notice 108 in association with an insurance policy at least 30 days prior to a planned renewal date 126 of that insurance policy, the insurance company may increase the premium associated with the insurance policy from a current premium 120 to a renewal premium 122 when the insurance policy renews on the planned renewal date 126. However, if the insurance company does not send the advance renewal notice 108 until a date that less than 30 days prior to the planned renewal date 126 of the insurance policy, the jurisdiction may bar the insurance company from increasing the premium of the insurance policy from the current premium 120 to the renewal premium 122 until a date that is 30 days after the date on which the advance renewal notice 108 was sent.

As an example, if an insurance policy was set to renew on March 31, and a 30-day advance renewal notice period 128 applies to the insurance policy, the target notice date 110 for the insurance policy may be March 1. If the insurance company sends an advance renewal notice 108 associated with the insurance policy on or before March 1, the insurance company may increase the premium of the insurance policy from the current premium 120 to the renewal premium 122 on March 31 in association with renewal of the insurance policy. However, if the insurance company does not send the advance renewal notice 108 until March 15, after the target notice date 110 of March 1, the insurance company may not increase the premium of the insurance policy from the current premium 120 to the renewal premium 122 until April 14, 30 days after the advance renewal notice 108 was sent on March 15.

As discussed above, the renewal adjustor 102 may automatically adjust policy data 104 in association with renewals of corresponding insurance policies. For example, if an advance renewal notice period 128 applies to an insurance policy and an advance renewal notice 108 associated with the insurance policy is not sent until after a corresponding target notice date 110, the renewal adjustor 102 may automatically adjust policy data 104 associated with the insurance policy to extend a current term 112 of an insurance policy and to shorten a subsequent renewal term 114 associated with the renewal of the insurance policy.

The renewal adjustor 102 may be a software application or other computer-implemented system that may access and edit the policy data 104 that is stored, maintained, and/or used by the policy management system 106. For example, the renewal adjustor 102 may access a database or other data repository associated with the policy management system 106 in order to evaluate the policy data 104, modify the policy data 104, and/or perform other operations associated with the policy data 104 described herein.

In some examples, the renewal adjustor 102 may be a component of the policy management system 106. In other examples, the renewal adjustor 102 may be an add-on or plug-in to the policy management system 106. In still other examples, the renewal adjustor 102 may be an element that executes separately from the policy management system 106, but that may access and edit the policy data 104 of the policy management system 106 via an application programming interface (API), database requests, a data connection, and/or other interface or connection.

The renewal adjustor 102 may have a late notice detector 130 that is configured evaluate policy data 104 in the policy management system 106, associated with insurance policies, to detect instances in which advance renewal notices 108 are not sent by corresponding target notice dates 110. The policy data 104 may indicate actual notice dates 132 when advance renewal notices 108 are sent by the policy management system 106 and/or other users or systems associated with an insurance company.

In some situations, although an advance renewal notice 108 associated with an insurance policy should be sent on or before a corresponding target notice date 110, the advance renewal notice 108 may not be sent until an actual notice date 132 that is after the target notice date 110. As an example, a technical error may prevent the policy management system 106 from sending the advance renewal notice 108 by the target notice date 110. As another example, human error may cause an advance renewal notice 108 to not be sent until after the target notice date 110. The late notice detector 130 of the renewal adjustor 102 may use the policy data 104 to determine whether advance renewal notices 108 associated with insurance policies are not sent until actual notice dates 132 that are after corresponding target notice dates 110.

The renewal adjustor 102 may also have a policy data modifier 134 that is configured to modify policy data 104 in the policy management system 106, associated with insurance policies, if the late notice detector 130 determines that advance renewal notices 108 associated with the insurance policies were not sent by corresponding target notice dates 110. For example, if the late notice detector 130 determines that an advance renewal notice 108 associated with an insurance policy was not sent until an actual notice date 132 that is after a target notice date 110, determined based on an advance renewal notice period 128 that applies to the insurance policy, the policy data modifier 134 may edit policy data 104 associated with the insurance policy in the policy management system 106 to change the current term 112 and the renewal term 114 of the insurance policy.

For instance, if an advance renewal notice 108 associated with an insurance policy was not sent until an actual notice date 132 that is after a target notice date 110, the renewal adjustor 102 may determine a corresponding notice delay period 136, such as a number of days between the target notice date 110 and the actual notice date 132. The policy data modifier 134 may accordingly edit the policy data 104, associated with the insurance policy in the policy management system 106, to extend the current term 112 by the notice delay period 136 and to shorten the renewal term 114 by the same notice delay period 136. In some examples, the policy data modifier 134 may also add or edit one or more flags or other indictors in the policy data 104 to indicate that the current term 112 has been extended relative to a previous version of the current term 112, and/or that the renewal term 114 has been shortened relative to a previous version of the renewal term 114.

By extending the current term 112 of the insurance policy by the notice delay period 136, the current term 112 may be extended to end on a date that is the advance renewal notice period 128 after the actual notice date 132 when the advance renewal notice 108 was sent. The renewal of the insurance policy may accordingly be effectively rescheduled from the original planned renewal date 126 to a rescheduled renewal date 138 that is after the extended current term 112 and at the beginning of the shortened renewal term 114. Accordingly, the renewal of the insurance policy may be delayed until the expiration of the extended current term 112, such that the renewal of the insurance policy and a corresponding increase of the associated premium from the current premium 120 to the renewal premium 122 may occur after the advance renewal notice period 128 has expired following the actual notice date 132 when the advance renewal notice 108 was sent.

As an example, an insurance policy may have a current term 112 that ends on June 30, such that a renewal is set to occur on a planned renewal date 126 of July 1 in association with a renewal term 114 that begins on July 1. In this example, a 60-day advance renewal notice period 128 may apply to the insurance policy, such that the target notice date 110 for the insurance policy may be May 2. If the advance renewal notice 108 is not sent until an actual notice date 132 of May 8, six days after the May 2 target notice date 110, the renewal adjustor 102 may determine that the notice delay period 136 is six days. Accordingly, the renewal adjustor 102 may extend the current term 112 by the six-day notice delay period 136 to July 6, and may shorten the renewal term 114 to begin on July 7, such that the renewal is rescheduled from an original planned renewal date 126 of July 1 to a rescheduled renewal date 138 of July 7. Because July 7 is 60 days after the advance renewal notice 108 was sent on May 8, the insurance company may comply with the 60-day advance renewal notice period 128 by not increasing the premium of the insurance policy from the current premium 120 to the renewal premium 122 until the delayed renewal occurs on the rescheduled renewal date 138 of July 7. For instance, the current premium 120 may remain in effect through the end of the extended current term 112 on July 6, and the renewal premium 122 may take effect at the beginning of the shortened renewal term 114 on July 7. Other examples of the renewal adjustor 102 changing the current term 112 and the renewal term 114 associated with an insurance policy are described herein, for instance as discussed below with respect to FIG. 2.

As discussed above, an insurance company may be barred from increasing a premium of an insurance policy, in association with renewal of the insurance policy, until the advance renewal notice period 128 has passed following an actual notice date 132 when a late advance renewal notice 108 was sent. However, in some examples, an exception to the advance renewal notice period 128 may apply, such that the insurance company may be permitted to increase a premium of an insurance policy, in association with renewal of the insurance policy, on an original planned renewal date 126 even if an advance renewal notice 108 was sent late after a corresponding target notice date 110. Such exceptions may be based on the reason why the advance renewal notice 108 was sent late, based on whether and/or how much the renewal premium 122 is set to exceed the current premium 120, and/or based on other criteria.

For example, a law, rule, regulation, or other policy that is applicable to a state or other jurisdiction may bar the insurance company from increasing a premium of an insurance policy in such a situation if an advance renewal notice 108 was sent late due to the fault of the insurance company, but not if the advance renewal notice 108 was sent late due to the fault of a policyholder 116. For instance, if the policyholder 116 associated with an insurance policy failed to make a payment, had indicated that the insurance policy would be canceled before then changing his or her mind and requesting renewal of the insurance policy, or took any other action that led to a delay in the insurance company sending an advance renewal notice 108 until after a target notice date 110, an exception in the advance renewal notice period 128 may permit the insurance company to increase a premium of the insurance policy from a current premium 120 to a renewal premium 122 at a planned renewal date 126.

Accordingly, when the late notice detector 130 determines that an advance renewal notice 108 associated with an insurance policy was sent after a corresponding target notice date 110, the renewal adjustor 102 may determine whether an exception to the corresponding advance renewal notice period 128 applies to the insurance policy. For example, the renewal adjustor 102 may determine that the advance renewal notice period 128 does not apply to the insurance policy, or that an exception to the advance renewal notice period 128 applies, if the renewal premium 122 is not set to increase, relative to the current premium 120, by more than a threshold amount. As another example, the renewal adjustor 102 may determine that the advance renewal notice period 128 does not apply to the insurance policy, or that an exception to the advance renewal notice period 128 applies, if the advance renewal notice 108 was sent late due to a reason that was not the fault of the insurance company.

As such, when the late notice detector 130 determines that an advance renewal notice 108 associated with an insurance policy was sent after a corresponding target notice date 110, a delay reason determiner 140 of the renewal adjustor 102 may be triggered. The delay reason determiner 140 may evaluate policy data 104 associated with the insurance policy to determine a reason why the advance renewal notice 108 was not sent by the target notice date 110. Based on the reason why the advance renewal notice 108 was not sent by the target notice date 110, and whether that reason indicates that an advance renewal notice period 128 applies or that an exception to that advance renewal notice period 128 applies, the policy data modifier 134 may or may not adjust policy data 104 associated with the insurance policy.

In some examples, the delay reason determiner 140 may determine, based on the policy data 104, that the advance renewal notice 108 was sent after the target notice date 110 because of a reason caused by the policyholder 116 associated with the insurance policy, such that the late advance renewal notice 108 was not the fault of the insurance company. For example, the delay reason determiner 140 may determine that the advance renewal notice 108 was sent late because the policyholder 116 missed a payment, because the policyholder 116 had requested cancelation of the insurance policy before then requesting renewal of the insurance policy, or because of another reason that that was not the fault of the insurance company.

In these examples in which the advance renewal notice 108 was sent after the target notice date 110 due to a reason that was not the insurance company's fault, an exception to the advance renewal notice period 128 may apply such that the policy data modifier 134 may avoid adjusting the policy data 104 despite the delayed advance renewal notice 108. For instance, the renewal adjustor 102 may avoid extending the current term 112 and may avoid shorting the renewal term 114, such that the renewal of the insurance policy and the increase from the current premium 120 to the renewal premium 122 may occur on the original planned renewal date 126 even though the advance renewal notice 108 was sent after the target notice date 110.

However, in other examples the delay reason determiner 140 may instead determine that the advance renewal notice 108 was sent after the target notice date 110 for a reason that was the fault of the insurance company. For example, the delay reason determiner 140 may determine that the advance renewal notice 108 was sent late due to a technical issue with the policy management system 106 or other system used by the insurance company, was sent late due to human error of an employee or representative of the insurance company, or was sent late due to any other reason that was the fault of the insurance company. Accordingly, if the delay reason determiner 140 determines that the advance renewal notice 108 was sent after the target notice date 110 due a reason that was the fault of the insurance company, the policy data modifier 134 may modify the policy data 104 associated with the insurance policy to extend the current term 112 and to shorten the renewal term 114 as described herein.

In some examples, the renewal adjustor 102 may have a dashboard 142, such as a dashboard 142 that may be displayed in a user interface of the renewal adjustor 102, the policy management system 106, or another system. The dashboard 142 may present metrics associated with advance renewal notices 108, operations of the renewal adjustor 102, and/or other elements described herein.

For instance, the dashboard 142 may indicate how many late advance renewal notices 108 have been detected over a period of time in association with one or more jurisdictions, how many of those late advance renewal notices 108 were due to reasons that were the fault of the insurance company, how many insurance policies have had current terms 112 extended and renewal terms 114 shortened by the renewal adjustor 102 due to late advance renewal notices 108, and/or other types of metrics. An example of the dashboard 142 is shown in FIG. 3, and is described further below with respect to that figure.

The dashboard 142 may be updated based on operations of one or more instances of the renewal adjustor 102. For example, as discussed further below, the policy data 104 may be associated with a large number of insurance policies, such as millions or hundreds of thousands of insurance policies, such that it may be impossible or impractical to manually evaluate the policy data 104 and/or to manually track or determine metrics associated with the policy data 104. However, one or more instances of the renewal adjustor 102 may be configured to evaluate and/or modify the policy data 104 as described herein. For example, different instances of the renewal adjustor 102 may evaluate different subsets of the policy data 104. One or more instances of the renewal adjustor 102 may accordingly automatically modify policy data 104 associated with corresponding insurance policies based on identifying that advance renewal notices 108 associated with those insurance policies were sent late, as described herein. The dashboard 142 may, in some examples, be updated in real-time, nightly, or on any other schedule based on information reported by one or more instances of the renewal adjustor 102. Accordingly, the dashboard 142 may display information about more insurance policies than could be processed manually, based on automatic processing of the policy data 104 by one or more instances of the renewal adjustor 102.

In some examples, the metrics shown in the dashboard 142 may allow a user to determine if and/or when there is a spike in a number of late advance renewal notices 108 that are due to reasons that are the fault of the insurance company. Accordingly, by identifying such a spike based on the metrics shown in the dashboard 142, the user may initiate an investigation into technical issues or other reasons that may be causing the spike in the number of late advance renewal notices 108. The investigation may result in such technical issues or other reasons being fixed or addressed, such that the number of late advance renewal notices 108 may decrease over a subsequent period of time, and the number of insurance policies for which the policy data modifier 134 extends a current term 112 and shortens a renewal term 114 may corresponding decrease over time.

Overall, the renewal adjustor 102 may determine instances in which advance renewal notices 108 associated with insurance policies are sent after corresponding target notice dates 110. If the renewal adjustor 102 determines that reasons for such late advance renewal notices 108 are the fault of the insurance company, the renewal adjustor 102 may edit policy data 104 maintained by the policy management system 106 to extend the current terms 112 of the insurance policies and to shorten the renewal terms 114 of the insurance policies by corresponding lengths of time based on how far after the target notice dates 110 the advance renewal notices 108 were sent. By extending the current terms 112 and shortening the renewal terms 114 of the insurance policies, increases of the premiums of the insurance policies from current premiums 120 to renewal premiums 122 may be delayed until the ends of the extended current terms 112 and/or the beginnings of the shortened renewal terms 114, such the premium increases occur after advance renewal notice periods 128 have elapsed following the actual notice dates 132 when the late advance renewal notices 108 were sent.

The renewal adjustor 102 may accordingly operate differently than to conventional systems in which insurance policies are renewed at originally planned dates even if advance renewal notices are sent late. In such conventional systems, if an advance renewal notice associated with an insurance policy is sent after a target notice date, the insurance policy may be renewed at the originally-planned renewal date. However, a premium rate table associated with the renewed insurance policy may be adjusted after the renewal, day-by-day and/or by prorating the daily premiums across the entire term of the renewed insurance policy, to account for a period of time after the renewal in which the previous premium is to remain in place until a date when an advance renewal notice period ends following the date when the late advance renewal notice was sent.

Unlike such conventional systems, the renewal adjustor 102 may avoid adjusting premium rate tables associated with insurance policies in situations in which advance renewal notices 108 are sent after target notice dates 110. As described herein, instead of allowing insurance policies to renew at planned renewal dates 126 and also adjusting rate tables accordingly after the renewals, the renewal adjustor 102 may extend current terms 112 and shorten renewal terms 114 as described above to cause renewals and corresponding premium increases to not occur until advance renewal notice periods 128 have elapsed following actual notice dates 132 when late advance renewal notice 108 were sent.

Moreover, in some examples, it may not be possible at a technical level to adjust premium rate tables in association with renewals of insurance policies when corresponding advance renewal notices 108 are sent after target notice dates 110. Although in some conventional systems such premium rate tables associated with insurance policies could be manually edited as described above when advance renewal notices 108 were sent after target notice dates 110, the policy management system 106 may not natively provide users and/or other systems with permissions and/or access to edit such premium rate tables associated with insurance policies.

For example, the policy management system 106 may store premium rate tables and/or other information about premiums associated with terms of insurance policies in a locked data format that the policy management system 106 does not permit users to edit during the corresponding terms of the insurance policies. As an example, the policy management system 106 may block premium information in the policy data 104 indicating the current premium 120 from being modified during the current term 112, and block premium information in the policy data 104 indicating the renewal premium 122 from being modified during the renewal term 114. Accordingly, because the policy management system 106 may be configured at a technical level to block users and/or systems from editing premium information associated with current terms of insurance policies after renewals of those insurance policies, it may not be technically possible for premium rate tables or other premium information to be accessed or edited via the policy management system 106 to account for situations in which previous premiums are to remain in place after renewals and until dates when advance renewal notice periods end following dates when late advance renewal notices were sent.

However, even if the policy management system 106 is configured to have such a technical barrier such that the policy management system 106 does not allow premium rate tables for insurance policies to be accessed or edited based on late advance renewal notices 108, the renewal adjustor 102 may nevertheless have access to other policy data 104 maintained by the policy management system 106 such that the renewal adjustor 102 may edit the policy data 104 to extend the current terms 112 and shorten the renewal terms 114 of those insurance policies as described herein. By extending current terms 112 and shortening renewal terms 114 automatically via the renewal adjustor 102 as described herein, instead of manually adjusting rate tables, the risk of human error associated with manually adjusting rate tables may also be reduced or eliminated.

Additionally, it may be infeasible for users of the policy management system 106 to manually perform the operations that the renewal adjustor 102 performs. For instance, it may be infeasible for users to manually track which advance renewal notice periods 128 apply to individual insurance policies, manually determine target notice dates 110 associated with individual insurance policies, manually determine whether advance renewal notices 108 associated with individual insurance policies are sent by corresponding target notice dates 110, to manually determine whether advance renewal notices 108 were sent late due to reasons that were the fault of the insurance company, and/or to manually adjust policy data 104 associated with individual insurance policies if advance renewal notices 108 are not sent by corresponding target notice dates 110.

As an example, the policy data 104 maintained by the policy management system 106 may represent hundreds of thousands or millions of insurance policies associated with many different jurisdictions. Accordingly, due to the volume of policy data 104 associated with such a large number of insurance policies, it may be impractical or impossible for users to manually evaluate the policy data 104 and identify individual instances in which advance renewal notices 108 associated with insurance policies were sent late such that increases in premiums should not go into effect until the end of corresponding advance renewal notice periods 128 following the dates when the advance renewal notices 108 were sent.

As another example, different jurisdictions may have different advance renewal notice periods 128 and/or may not have advance renewal notice periods 128. Moreover, some advance renewal notice periods 128 may apply to some types of insurance policies and not other types of insurance policies. Accordingly, it may be impractical or impossible for users to manually evaluate policy data 104 representing hundreds of thousands or millions of insurance policies associated with many different jurisdictions to determine which insurance policies are subject to advance renewal notice periods 128, and/or which advance renewal notice periods 128 apply to those insurance policies.

However, the renewal adjustor 102 may be configured to automatically evaluate such a large volume of policy data 104 to identify individual insurance policies associated with late advance renewal notice 108, and to automatically adjust the policy data 104 to extend current terms 112 and to shorten renewal terms 114 accordingly. For example, the renewal adjustor 102 may be configured to execute a nightly batch job in which the renewal adjustor 102 accesses policy data 104 associated with hundreds, thousands, or millions of insurance policies, automatically determines which jurisdictions are associated with each of the individual insurance policies, automatically determines whether advance renewal notice periods 128 of corresponding jurisdictions apply to individual insurance policies, automatically identifies corresponding target notice dates 110 that apply to individual insurance policies based on such advance renewal notice periods 128, automatically determines whether advance renewal notices 108 associated with individual insurance policies were not sent by corresponding target notice dates 110, automatically determines reasons why such advance renewal notices 108 were sent late in association with individual insurance policies, and/or automatically adjusts policy data 104 to extend current terms 112 and to shorten renewal terms 114 of individual insurance policies. The renewal adjustor 102 may accordingly process more policy data 104 automatically as described herein than a human user could practically evaluate manually.

In some examples, multiple instances of the renewal adjustor 102 may execute simultaneously and/or in parallel. For example, different instances of the renewal adjustor 102 may be configured to perform nightly batch jobs to evaluate policy data 104 associated with distinct sets of insurance policies. Accordingly, because there may be a large volume of policy data 104 as discussed above, different instances of the renewal adjustor 102 may be configured to automatically perform the operations described herein with respect to different subsets of insurance policies. The different instances of the renewal adjustor 102 may execute via different computing platforms that may be networked together, via different virtual computing environments, and/or other types of computing environments as described further below with respect to FIG. 5.

As described above, when an advance renewal notice period 128 applies to an insurance policy and an advance renewal notice 108 associated with the insurance policy is not sent until after a target notice date 110, the renewal adjustor 102 may edit policy data 104 maintained by the policy management system 106 to extend a current term 112 of the insurance policy by a notice delay period 136 between the target notice date 110 and an actual notice date 132 when the advance renewal notice 108 was sent. The renewal adjustor 102 may also edit the policy data 104 to shorten a renewal term 114 of the insurance policy by the same notice delay period 136. Accordingly, the renewal of the insurance policy may be effectively rescheduled from an original planned renewal date 126 to a later rescheduled renewal date 138 based on the extended current term 112 and/or the shortened renewal term 114, such than an increase from the current premium 120 to the renewal premium 122 due to the renewal at the rescheduled renewal date 138 does not occur until the advance renewal notice period 128 has elapsed following the actual notice date 132. An example of a current term 112 of an insurance policy being extended, and a renewal term 114 of the insurance policy being shortened, by the renewal adjustor 102 is discussed further below with respect to FIG. 2.

Figure 2:
FIG. 2 shows an example of policy data associated with an insurance policy being edited by the renewal adjustor based on a determination that an advance renewal notice associated with the insurance policy was not sent until after a target notice date.

FIG. 2 shows an example 200 of policy data 104 associated with an insurance policy being edited by the renewal adjustor 102 based on a determination that an advance renewal notice 108 associated with the insurance policy was not sent until after a target notice date 110. The policy data 104 may be maintained by the policy management system 106, but may be accessed and edited by the renewal adjustor 102.

As shown in FIG. 2, the policy data 104 for the insurance policy may, prior to modification by the renewal adjustor 102, initially indicate that the current term 112 of the insurance policy spans from January 1 through June 30, and that the current premium 120 of the insurance policy during the current term 112 is $100 per month. The policy data 104 may also initially indicate that after the current term 112 of the insurance policy expires, the insurance policy is set to be renewed on a planned renewal date 126 of July 1 for a renewal term 114 of July 1 through December 31, and that the renewal premium 122 of the insurance policy during the upcoming renewal term 114 is set to increase from the current premium 120 of $100 per month to a renewal premium 122 of $125 per month.

The insurance policy represented by the policy data 104 shown in FIG. 2 may be associated with a jurisdiction that has a 45-day advance renewal notice period 128 for insurance policies that are set to be renewed in association with a premium increase of more than 20%. In example 200, because the policy data 104 indicates that the renewal of the insurance policy will be associated with a 25% premium increase, from the current premium 120 of $100 per month to the renewal premium 122 of $125 per month, the 45-day advance renewal notice period 128 may apply to the insurance policy. Accordingly, the target notice date 110 associated with the insurance policy may be May 17, 45 days prior to the planned renewal date 126 of July 1.

However, in this example, a technical error or other issue may cause the advance renewal notice 108 to be sent on an actual notice date 132 of June 6, 20 days after the target notice date 110 associated with the insurance policy. The renewal adjustor 102 may accordingly determine that the notice delay period 136 is 20 days. The renewal adjustor 102 may also edit the policy data 104 maintained by the policy management system 106 to extend the current term 112 by the 20-day notice delay period 136, and to correspondingly shorten the renewal term 114 by the 20-day notice delay period 136. For example, the renewal adjustor 102 may edit the policy data 104 to change the current term 112 from the original term of January 1 through June 30 to an extended term of January 1 through July 20. Similarly, the renewal adjustor 102 may edit the policy data 104 to change the renewal term 114 from the original term of July 1 through December 31 to a shortened term of July 21 through December 31.

Although the renewal adjustor 102 may extend the current term 112 and shorten the renewal term 114 in the policy data 104, the current premium 120 and the renewal premium 122 may be left unmodified in the policy data 104. However, based on the edits to the policy data 104 maintained and used by the policy management system 106, the current premium 120 of $100 per month may remain in effect through the end of the extended current term 112 on July 20, and the renewal premium 122 of $125 per month may go into effect on July 21 at the beginning of the shortened renewal term 114.

Accordingly, although the period of time between July 1 and July 20 had initially been a part of the renewal term 114 when the higher renewal premium 122 of $125 per month was set to go into effect, the changes to the policy data 104 allow the lower current premium 120 of $100 per month to remain in effect between July 1 and July 20 and for the higher renewal premium 122 of $125 per month to take effect on July 21. In this example, the edits to the policy data 104 can cause the premium increase from $100 per month to $125 per month to be delayed until July 21, 45 days after the actual notice date 132 of June 6, and thus allow the insurance company to comply with the 45-day advance renewal notice period 128 that applies to the insurance policy.

As shown in FIG. 2, the renewal adjustor 102 may shorten the renewal term 114 by delaying the beginning date of the renewal term 114 by the notice delay period 136. However, the renewal adjustor 102 may leave the ending date of the renewal term 114 unchanged. Accordingly, the next renewal of the insurance policy may occur as originally planned after the shorted renewal term 114 expires on December 31, unless the ending date of the renewal term 114 is subsequently moved by the renewal adjustor 102 due to a delay in sending the next advance renewal notice 108 associated with the insurance policy.

The renewal adjustor 102 may track when it adjusts policy data 104 associated with insurance policies, for example as shown in FIG. 2. The renewal adjustor 102 may also track how many insurance policies are subject to advance renewal notice periods 128, whether the renewal adjustor 102 does or does not adjust policy data 104 associated with insurance policies based on such advance renewal notice period 128, and/or track other types of data as described herein. The renewal adjustor 102 may display such tracked data, and/or other metrics derived from tracked data, via the dashboard 142 as described further below with respect to FIG. 3.

FIG. 3 shows an example 300 of the dashboard 142 of the renewal adjustor 102. As discussed above, the dashboard 142 may display metrics associated with advance renewal notices 108, operations of the renewal adjustor 102, and/or other elements described herein. In some examples, the dashboard 142 may display metrics based on information reported by multiple instances of the renewal adjustor 102, such as different instances of the renewal adjustor 102 that are configured to process different subsets of policy data 104 associated with a large number of insurance policies.

The dashboard 142 may display metrics associated with a particular period of time, such as the last 24 hours, a particular month, or any other period of time. In some examples, the dashboard 142 may display metrics associated with a period of time selected by a user. For example, a user may interact with the dashboard 142 to change the period of time for which the dashboard 142 displays corresponding metrics. In some examples, a user May also, or alternately, be able to configure the dashboard 142 to display metrics associated with a particular jurisdiction, a particular type of insurance policy, and/or other attributes. For instance, the dashboard 142 may allow a user to filter which metrics are displayed and/or the types of insurance policies that are associated with displayed metrics.

Various types of metrics may be displayed via the dashboard 142. For example, as shown in the example 300 of FIG. 3, the dashboard 142 may indicate how many renewals were performed by the policy management system 106 during a selected time period. The dashboard 142 may also, or alternately, indicate how many of the renewals during the selected time period were subject to advance renewal notice periods 128. As described herein, different jurisdictions may or may not have advance renewal notice periods 128, may have advance renewal notice periods 128 of differing lengths, and/or have advance renewal notice periods 128 that apply do different situations and/or different types of insurance policies. Accordingly, the number of insurance policies and/or renewals that are subject to advance renewal notice periods 128 may differ from a total number of renewals performed by the policy management system 106.

The dashboard 142 may also, or alternately, indicate how many advance renewal notice 108 were sent during the selected time period and/or how many advance renewal notices 108 were sent late after corresponding target notice dates 110. The dashboard 142 may also, or alternately, indicate how many of the late advance renewal notices 108 were sent late due to reasons associated with the corresponding policyholders 116 and/or due to reasons that were the fault of the insurance company.

The dashboard 142 may also, or alternately, indicate how many renewals were delayed by the renewal adjustor 102, based on the renewal adjustor 102 automatically editing policy data 104 to extend current terms 112 and to shorten renewal terms 114 as described herein. As described herein, although advance renewal notice period 128 may apply to some types of insurance policies, exceptions may apply such that the original current terms 112 and original renewal terms 114 of some insurance policies may remain unchanged in the policy data 104, for instance if advance renewal notice 108 were sent late due to policyholder issues and/or because renewal premiums 122 were not set to exceed current premiums 120 by more than threshold amounts. Accordingly, in some situations such exceptions may cause the number of delayed renewals shown in the dashboard 142 to be less than the overall number of late advance renewal notices 108.

As discussed above, in some examples the metrics shown in the dashboard 142 may indicate if and/or when there is a spike in a number of late advance renewal notices 108 that are due to reasons that are the fault of the insurance company. The dashboard 142 may similarly indicate if and/or when there is a spike in a number of automatically delayed renewals in response to such late advance renewal notices 108. Accordingly, by identifying such a spike based on the metrics shown in the dashboard 142, a user may initiate an investigation into technical issues or other reasons that may be causing the spike in the number of late advance renewal notices 108 and/or corresponding automatically-delayed renewals.

Although metrics may be displayed to a user via the dashboard 142 of the renewal adjustor 102 as shown in FIG. 3, the renewal adjustor 102 may also operate automatically, without being controlled by a user, to identify insurance policies that are associated with late advance renewal notices 108 and to adjust corresponding policy data 104 automatically. An example process by which the renewal adjustor 102 may identify insurance policies associated with late advance renewal notices 108 and automatically adjust corresponding policy data 104 is discussed further below with respect to FIG. 4.

Figure 4:
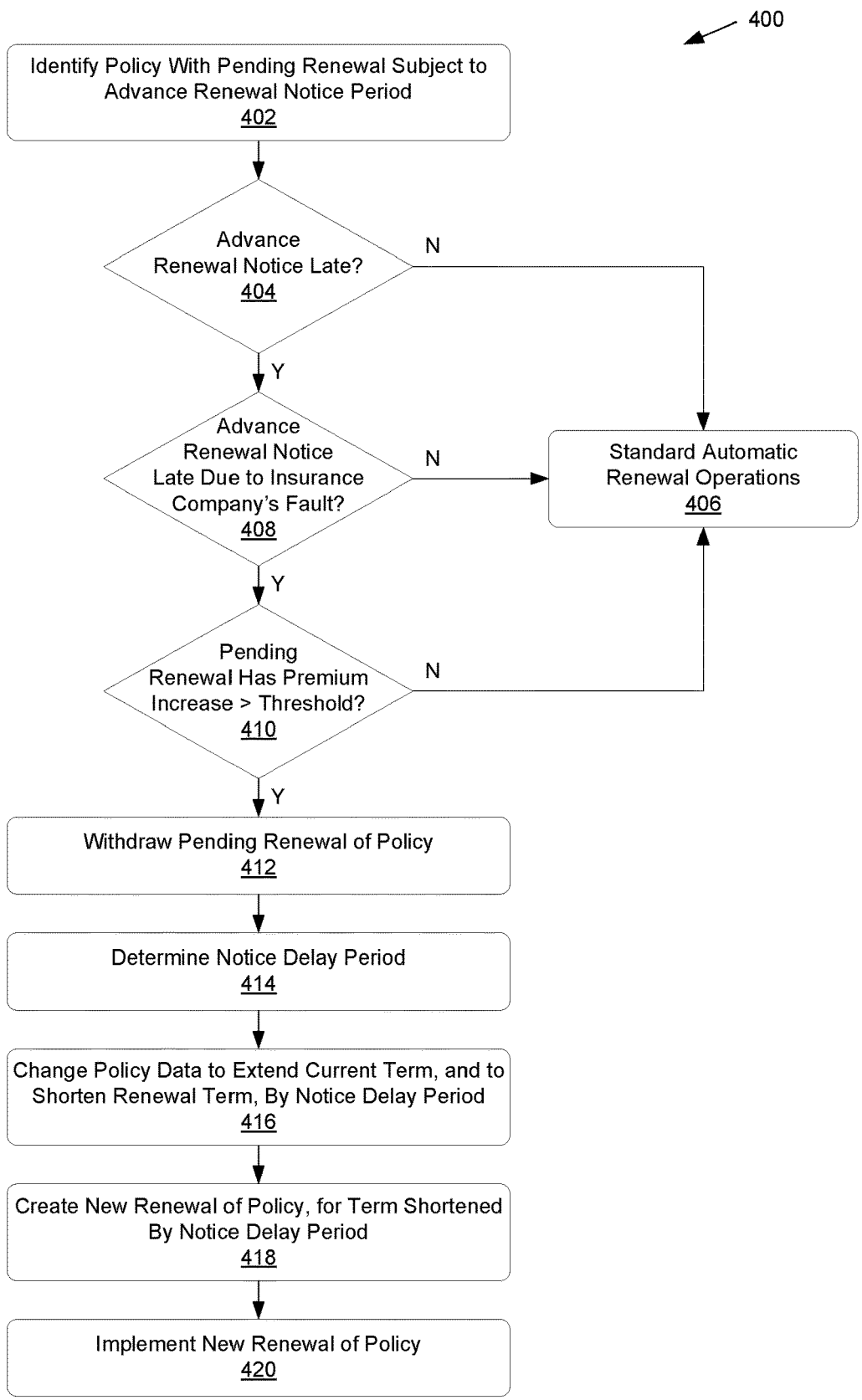
FIG. 4 shows a flowchart illustrating an example method for changing policy data associated with an insurance policy, in association with a renewal of the insurance policy.

FIG. 4 shows a flowchart illustrating an example method 400 for changing policy data 104 associated with an insurance policy, in association with a renewal of the insurance policy. The method 400 shown in FIG. 4 may be performed by a computing system that executes the renewal adjustor 102. An example system architecture for such a computing system is described below with respect to FIG. 5.

At block 402, the computing system may access policy data 104 maintained by the policy management system 106 to identify an insurance policy that has an upcoming pending renewal and that is subject to an advance renewal notice period 128. As described herein, some insurance policies may be associated with jurisdictions that have advance renewal notice period 128, while other insurance policies may be associated with jurisdictions that do not have advance renewal notice period 128. Additionally, in jurisdictions that do have advance renewal notice periods 128, the advance renewal notice periods 128 may differ and/or apply to different types of insurance policies. Accordingly, at block 402, the computing system may identify an insurance policy with an upcoming pending renewal scheduled for a planned renewal date 126, determine that an advance renewal notice period 128 applies to the insurance policy, and determine a number of days defined by the advance renewal notice period 128 that applies to the insurance policy.

For instance, an advance renewal notice period 128 of a jurisdiction may apply to vehicle insurance policies, associated with that jurisdiction, that cover vehicles used for business purposes. As an example, the advance renewal notice period 128 may apply to vehicle insurance policies for which policy attributes 118 indicate that names of corresponding policyholders 116 are business names or other non-natural names, instead of names of people. As another example, the advance renewal notice period 128 may apply to vehicle insurance policies for which policy attributes 118 indicate that vehicles are used on a farm or other commercial setting, indicate that vehicles are owned or operated as part of a business, or otherwise indicate that vehicles are primarily used for business purposes instead of personal use. In these examples, at block 402 the computing system may access policy attributes 118 in policy data 104 maintained by the policy management system 106 to identify an insurance policy that is associated with the jurisdiction and that covers a vehicle used for business purposes, and thereby determine that the insurance policy is subject to the advance renewal notice period 128 of the jurisdiction.

At block 404, the computing system may determine whether an advance renewal notice 108 associated with the identified insurance policy was sent late, on an actual notice date 132 that was after a target notice date 110. For example, based on identifying the insurance policy subject to the advance renewal notice period 128 at block 402, the computing system may access policy data 104 to determine when the current term 112 of the insurance policy is currently set to end and when a subsequent renewal term 114 of the insurance policy is currently set to be begin, and thereby determine the current planned renewal date 126 of the insurance policy. Additionally, based on identifying the advance renewal notice period 128 that applies to the insurance policy, the computing system may determine a number of days defined by the advance renewal notice period 128. The computing system may derive the target notice date 110 associated with the insurance policy based on the planned renewal date 126 indicated by the policy data 104 and the number of days associated with the advance renewal notice period 128 that applies to the insurance policy. As an example, if the computing system determines that a 30-day advance renewal notice period 128 applies to the insurance policy, and the planned renewal date 126 is set for October 15, the computing system may determine that the target notice date 110 is September 15. The computing system may also access the policy data 104 to determine an actual notice date 132 when an advance renewal notice 108 associated with the insurance policy was sent, such that the computing system may determine whether the actual notice date 132 was sent late, after the target notice date 110, at block 404.

If the computing system determines that an advance renewal notice 108 associated with the insurance policy was not sent late (Block 404—No), for instance because the advance renewal notice 108 was sent on an actual notice date 132 that was on or before the target notice date 110, the computing system may avoid editing the policy data 104 to extend the current term 112 and shorten the renewal term 114. Accordingly, because the current term 112 and the renewal term 114 may remain unchanged in the policy data policy data 104, the policy management system 106 may perform standard automatic renewal operations at block 406 to renew the insurance policy at the original planned renewal date 126 following the end of the original non-extended current term 112.

However, if the computing system determines that an advance renewal notice 108 associated with the insurance policy was sent late (Block 404—Yes), for instance because the advance renewal notice 108 was sent on an actual notice date 132 that was after the target notice date 110, the computing system may determine at block 408 whether the advance renewal notice 108 was sent late for a reason that was the fault of the insurance company. For example, at block 408 the computing system may evaluate policy data 104 associated with the insurance policy to determine whether the advance renewal notice 108 was sent late due to a reason that was the fault of the corresponding policyholder 116, or for another reason that was the fault of the insurance company.

If the computing system determines that the advance renewal notice 108 was sent late due to a reason that was not the fault of the insurance company (Block 408—No), the computing system may avoid editing the policy data 104 to extend the current term 112 and to shorten the renewal term 114, such that the policy management system 106 may perform standard automatic renewal operations at block 406 to renew the insurance policy at the original planned renewal date 126 following the end of the original non-extended current term 112. For example, if the advance renewal notice 108 was sent late because the policyholder 116 had missed one or more payments, or had indicated that the insurance policy would be canceled before then requesting renewal of the insurance policy, the advance renewal notice 108 may have been late because of the policyholder 116 and not because of a reason that was the fault of the insurance company. Accordingly, although the advance renewal notice period 128 may apply to a type of the insurance policy, such as a vehicle insurance policy for a vehicle used for business purposes, the jurisdiction may permit the insurance company to not comply with the advance renewal notice period 128 because the advance renewal notice 108 was not sent late due to a reason that was the fault of the insurance company. Standard automatic renewal operations may thus proceed at the original planned renewal date 126 at block 406, even though the advance renewal notice 108 was sent after the target notice date 110.

However, if the computing system determines that the advance renewal notice 108 was sent late due to a reason that was the fault of the insurance company (Block 408—Yes), for instance because the advance renewal notice 108 was not sent on time due to a technical error with the policy management system 106 or another system associated with the insurance company or due to a human error of an employee or other representative of the insurance company, the computing system may determine at block 410 whether the renewal of the insurance policy is associated with a premium increase that exceeds a threshold increase. For example, the jurisdiction that sets the advance renewal notice period 128 may also indicate a threshold increase associated with the advance renewal notice period 128. Accordingly, the jurisdiction may permit the insurance company to not comply with the advance renewal notice period 128 if the renewal premium 122 is set to be equal to or less than the current premium 120, or if the renewal premium 122 does not exceed the current premium 120 by more than the threshold increase.

If the computing system determines that the renewal of the insurance policy is associated with a premium increase that does not exceed the threshold increase (Block 410—No), the computing system may avoid editing the policy data 104 to extend the current term 112 and to shorten the renewal term 114, such that the policy management system 106 may perform standard automatic renewal operations at block 406 to renew the insurance policy at the original planned renewal date 126 following the end of the original non-extended current term 112. For example, the threshold increase set by the jurisdiction may be a 25% increase in the premium associated with the insurance policy. The policy data 104 may indicate that the renewal premium 122 is set to be a value that is less than the current premium 120, a value that is equal to the current premium 120, or a value that is higher than the current premium 120 but is less than 25% above the current premium 120. Accordingly, because the policy data 104 indicates that the renewal premium 122 is not set to be more than 25% higher than the current premium 120, the jurisdiction may permit the insurance company to not comply with the advance renewal notice period 128, such that standard automatic renewal operations may proceed at the original planned renewal date 126 at block 406 despite the advance renewal notice 108 having been sent after the target notice date 110.

However, if the computing system determines that the pending renewal of the insurance policy is associated with a premium increase that exceeds the threshold increase (Block 410—Yes), the computing system may cause the policy management system 106 to withdraw the pending renewal at block 412. For example, if the policy management system 106 has already scheduled or otherwise prepared for standard automated renewal operations to renew the insurance policy at the original planned renewal date 126, the computing system may cause the policy management system 106 to cancel the pending standard automated renewal operations that were set to take place on the original planned renewal date 126.

At block 414, the computing system may determine the notice delay period 136 between the target notice date 110 and the actual notice date 132 when the advance renewal notice 108. As an example, based on determining that the advance renewal notice 108 associated was sent late, on an actual notice date 132 that was after a target notice date 110, the computing system may determine the number days between the target notice date 110 and the actual notice date 132, and use that number of days as the notice delay period 136.

At block 416, the computing system may change the policy data 104 associated with the insurance policy to extend the current term 112 of the insurance policy by the notice delay period 136 determined at block 414. For example, if the notice delay period 136 is ten days, the computing system may edit the policy data 104 to delay the ending date of the current term 112 by ten days, and thereby extend the current term 112 by the notice delay period 136. The computing system may access and edit the policy data 104 maintained and used by the policy management system 106, such that extending the current term 112 in the policy data 104 may delay or reschedule renewal of the insurance policy by the policy management system 106 until after the extended current term 112 ends.

At block 416, the computing system may change the policy data 104 associated with the insurance policy to extend the current term 112, and to shorten the renewal term 114, by the notice delay period 136 determined at block 414. For example, if the notice delay period 136 is ten days, the computing system may edit the policy data 104 to delay the ending date of the current term 112 by ten days, and thereby extend the current term 112 by the notice delay period 136. The computing system may also edit the policy data 104 to delay the beginning date of the renewal term 114 by ten days, and thereby shorten the renewal term 114 by the notice delay period 136.

At block 418, the computing system may cause the policy management system 106 to create a new renewal of the insurance policy, for the shortened renewal term 114. The policy data 104 edited at block 416 may be policy data 104 that is maintained and used by the policy management system 106. Accordingly, by withdrawing an initially-pending renewal at block 412, and by extending the current term 112 and/or shortening the renewal term 114 in the policy data 104 used by the policy management system 106, the new renewal initiated at block 418 may be a delayed or rescheduled renewal of the insurance policy by the policy management system 106 that is set to take place after the extended current term 112 ends and/or at the beginning of the shortened renewal term 114.

For example, if the policy management system 106 has already scheduled or otherwise prepared for standard automated renewal operations to renew the insurance policy at the original planned renewal date 126, the computing system may cause the policy management system 106 to cancel the pending standard automated renewal operations that were set to take place on the original planned renewal date 126. Accordingly, the new renewal of the insurance policy may be implemented by the policy management system 106 at block 420. For example, at block 420 the policy management system 106 may perform automatic renewal operations to renew the insurance policy at the rescheduled renewal date 138 following the end of the extended current term 112 and/or at the beginning of the shortened renewal term 114, instead of performing standard automatic renewal operations at the original planned renewal date 126.

Although FIG. 4 shows the computing system following the method 400 in association with a single insurance policy, the computing system may repeat the method 400 in association with multiple insurance policies and/or perform steps of method 400 in parallel in association with multiple insurance policies. For example, the computing system may execute the method 400 nightly as part of a batch process that evaluates policy data 104 for large sets of insurance policies, such as thousands, hundreds of thousands, or millions of insurance policies. The computing system may accordingly use the method 400 to evaluate large numbers of different insurance policies, for instance to determine whether individual insurance policies are associated with jurisdictions that have advance renewal notice periods 128, identify specific advance renewal notice periods 128 that apply to those jurisdictions, determine whether advance renewal notices 108 have or have not been sent for insurance policies that are subject to corresponding advance renewal notice periods 128, identify insurance policies associated with advance renewal notices 108 that were sent late after corresponding target notice dates 110, determine whether exceptions to the advance renewal notice periods 128 apply because late advance renewal notices 108 were not due to the fault of the insurance company and/or are associated with insurance policies that do not have premium increases that exceed corresponding thresholds, to identify particular insurance policies that should have terms adjusted due to late advance renewal notices 108, and to automatically edit policy data 104 associated with those particular insurance policies. The computing system may accordingly automatically evaluate a large number of different insurance policies that may have different applicable advance renewal notice periods 128, different target notice dates 110, different notice delay periods 136, and/or other differing variables, and potentially adjust policy data 104 associated with each of the different insurance policies based on the unique corresponding variables of each different insurance policy as described herein.

Figure 5:
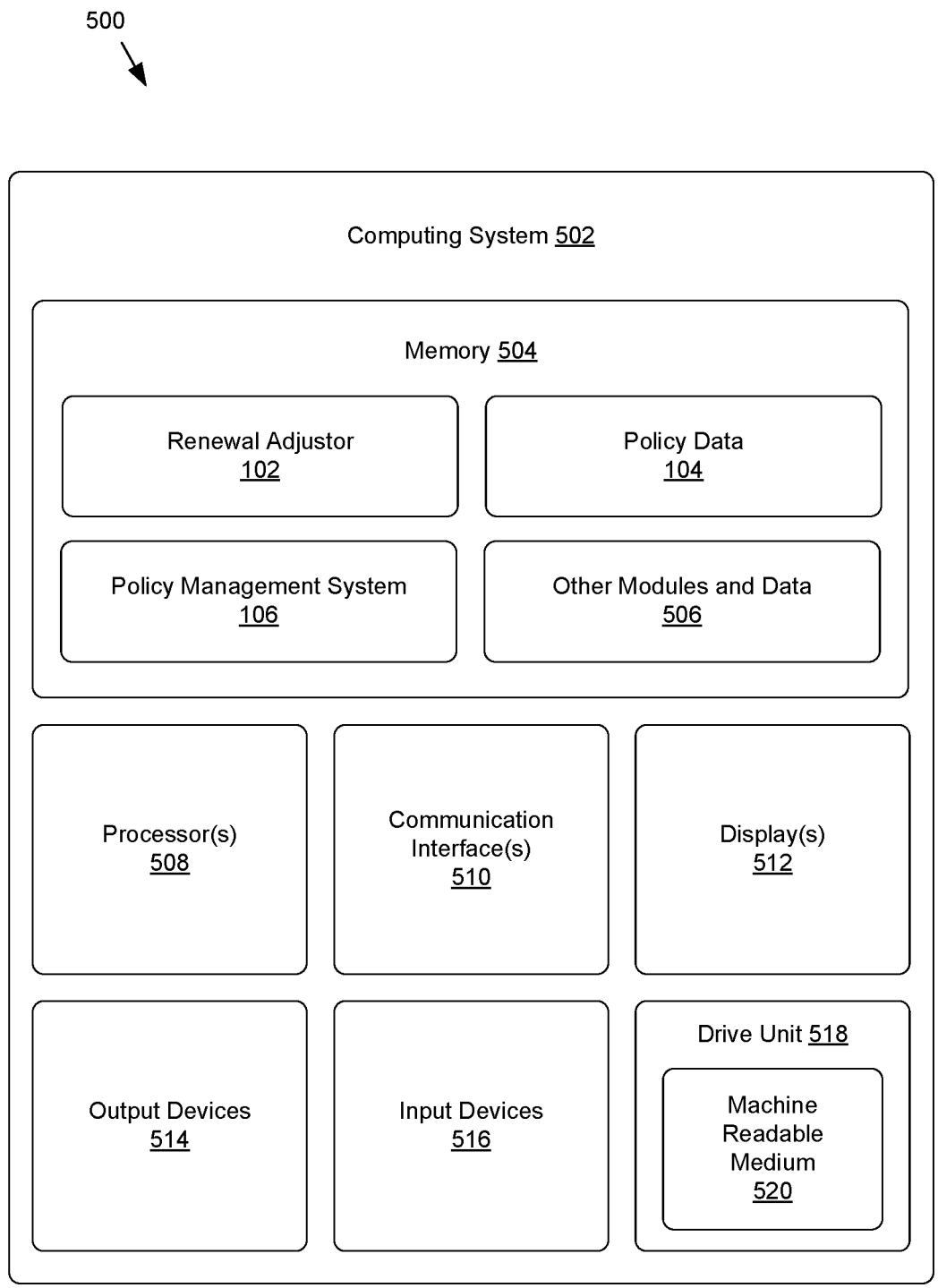
FIG. 5 shows an example system architecture for a computing system that may execute one or more elements of the renewal adjustor and/or other elements described herein.

FIG. 5 shows an example system architecture 500 for a computing system 502 that may execute one or more elements of the renewal adjustor 102 and/or other elements described herein. The computing system 502 may include one or more computers, servers, or other types of computing devices. Individual computing devices of the computing system 502 may have the system architecture 500 shown in FIG. 5, or a similar system architecture.

In some examples, elements associated with the renewal adjustor 102 may be distributed among, and/or be executed by, multiple computing systems or devices similar to the computing system 502 shown in FIG. 5. As an example, the renewal adjustor 102 may be executed by a different computing system than a computing system that executes other components of the policy management system 106 and/or that stores the policy data 104 used by the policy management system 106. As another example, individual elements of the renewal adjustor 102, such as the late notice detector 130, the policy data modifier 134, the delay reason determiner 140, and/or the dashboard 142 may be executed by the same computing system or may be distributed among different computing systems. The computing system 502 may, in some examples, include or be part of a cloud computing environment or other distributed system that hosts and/or executes one or more elements associated with the renewal adjustor 102.

The computing system 502 may include memory 504. In various examples, the memory 504 may include system memory, which may be volatile (such as RAM), non-volatile (such as ROM, flash memory, etc.) or some combination of the two. The memory 504 may further include non-transitory computer-readable media, such as volatile and nonvolatile, removable and non-removable media implemented in any method or technology for storage of information, such as computer readable instructions, data structures, program modules, or other data. System memory, removable storage, and non-removable storage are all examples of non-transitory computer-readable media. Examples of non-transitory computer-readable media include, but are not limited to, RAM, ROM, EEPROM, flash memory or other memory technology, CD-ROM, digital versatile discs (DVD) or other optical storage, magnetic cassettes, magnetic tape, magnetic disk storage or other magnetic storage devices, or any other non-transitory medium which may be used to store desired information and which may be accessed by the computing system 502. Any such non-transitory computer-readable media may be part of the computing system 502.

The memory 504 may store data and/or computer-executable instructions, such as data and/or computer-executable instructions associated with software elements. For instance, the memory 504 may store data and/or computer-executable instructions associated with the renewal adjustor 102, the policy management system 106, and/or policy data 104 maintained and used by the policy management system 106. As an example, the memory 504 may store data and/or computer-executable instructions associated with the renewal adjustor 102 and/or the policy management system 106. As another example, the memory 504 may store the policy data 104 maintained and used by the policy management system 106, such that the renewal adjustor 102 may access and edit the policy data 104 in the memory 504.

The memory 504 may also store other modules and data 506 that may be utilized by the computing system 502 to perform or enable performing any action taken by the computing system 502. For example, the other modules and data 506 may include a platform, operating system, and/or applications, as well as data utilized by the platform, operating system, and/or applications.

The computing system 502 may also have processor(s) 508, communication interfaces 510, a display 512, output devices 514, input devices 516, and/or a drive unit 518 including a machine readable medium 520.

In various examples, the processor(s) 508 may be a central processing unit (CPU), a graphics processing unit (GPU), both a CPU and a GPU, or any other type of processing unit. Each of the one or more processor(s) 508 may have numerous arithmetic logic units (ALUs) that perform arithmetic and logical operations, as well as one or more control units (CUs) that extract instructions and stored content from processor cache memory, and then executes these instructions by calling on the ALUs, as necessary, during program execution. The processor(s) 508 may also be responsible for executing computer applications stored in the memory 504, which may be associated with types of volatile (RAM) and/or nonvolatile (ROM) memory.

The communication interfaces 510 may include transceivers, modems, network interfaces, antennas, and/or other components that may transmit and/or receive data over networks or other connections. In some examples, the communication interfaces 510 may be used to exchange data between elements described herein.

The display 512 may be a liquid crystal display, or any other type of display commonly used in computing devices. In some examples, the dashboard 142 may be displayed via the display 512. The output devices 514 may include any sort of output devices known in the art, such as the display 512, speakers, a vibrating mechanism, and/or a tactile feedback mechanism. Output devices 514 may also include ports for one or more peripheral devices, such as headphones, peripheral speakers, and/or a peripheral display.

The input devices 516 may include any sort of input devices known in the art. For example, input devices 516 may include a microphone, a keyboard/keypad, and/or a touch-sensitive display, such as a touch-sensitive display screen. A keyboard/keypad may be a push button numeric dialing pad, a multi-key keyboard, or one or more other types of keys or buttons, and may also include a joystick-like controller, designated navigation buttons, or any other type of input mechanism.

The machine readable medium 520 may store one or more sets of instructions, such as software or firmware, that embodies any one or more of the methodologies or functions described herein. The instructions may also reside, completely or at least partially, within the memory 504, processor(s) 508, and/or communication interface(s) 510 during execution thereof by the computing system 502. The memory 504 and the processor(s) 508 also may constitute machine readable media 520.

Although the subject matter has been described in language specific to structural features and/or methodological acts, it is to be understood that the subject matter is not necessarily limited to the specific features or acts described above. Rather, the specific features and acts described above are disclosed as example embodiments.

What is claimed is:

1. A computer-implemented method, comprising:
  accessing, by a renewal adjustor executed by a computing system comprising a processor, a data repository associated with a policy management software application, wherein:
    the data repository stores policy data associated with policies, and premium information, in the policy data, is stored in a locked data format that blocks modification of the premium information associated with the policies after starting dates of terms of the policies;

identifying, by the renewal adjustor, and based on the policy data, a policy that is scheduled for renewal;

determining, by the renewal adjustor, and based on the policy data, that an advance renewal notice associated with the policy was sent late, after a target date, by a particular number of days, wherein:

the advance renewal notice having been sent late by the particular number of days would cause an adjusted premium associated with a renewal term of the policy, following a current term of the policy, to go into effect after a starting date of the renewal term, and the policy management software application is configured, based on the locked data format, to block a change, after the starting date of the renewal term, to the premium information that would cause the adjusted premium to become effective after the starting date of the renewal term; and modifying, by the renewal adjustor and in response to determining that the advance renewal notice was sent late by the particular number of days, the policy data to:

extend the current term of the policy, associated with a current premium, by the particular number of days; and shorten the renewal term of the policy, associated with the adjusted premium, by the particular number of days, wherein modifying the policy data causes the policy management software application to delay the renewal of the policy, and delay the starting date of the renewal term, by the particular number of days.

2. The computer-implemented method of claim 1, further comprising:

determining, by the renewal adjustor, that an advance notice period applies to the policy; and determining, by the renewal adjustor, the target date based on the advance notice period and an end date of the current term indicated by the policy data prior to modification of the policy data.

3. The computer-implemented method of claim 2, further comprising:

determining, by the renewal adjustor, and based on the policy data, a jurisdiction associated with the policy; and identifying, by the renewal adjustor, the advance notice period from among a plurality of advance notice periods associated with different jurisdictions, based on the jurisdiction associated with the policy.

4. The computer-implemented method of claim 2, wherein the renewal adjustor determines that the advance notice period applies to the policy based on:

determining, by the renewal adjustor, a type of the policy; and determining, by the renewal adjustor, that the advance notice period is applicable to the type of the policy.

5. The computer-implemented method of claim 4, wherein the type of the policy covers a vehicle used for non-personal use.

6. The computer-implemented method of claim 2, wherein the renewal adjustor determines that the advance notice period applies to the policy based on:

determining, by the renewal adjustor, that a company associated with the policy was at fault for sending the advance renewal notice late.

7. The computer-implemented method of claim 2, wherein the renewal adjustor determines that the advance notice period applies to the policy based on:

identifying, by the renewal adjustor, and based on the policy data prior to modification of the policy data, the current premium associated with the current term;

identifying, by the renewal adjustor, and based on the policy data prior to modification of the policy data, the adjusted premium associated with the renewal term; and determining, by the renewal adjustor, that the adjusted premium exceeds the current premium by at least a threshold amount.

8. The computer-implemented method of claim 1, wherein the delay of the renewal of the policy, caused by modifying the policy data, causes the adjusted premium to go into effect on the starting date of the renewal term after the particular number of days has passed following an actual notice date when the advance renewal notice was sent.

9. The computer-implemented method of claim 1, wherein the policy is a first policy, the advance renewal notice is a first advance renewal notice, and the particular number of days is a first particular number of days, the method further comprising:

identifying, by the renewal adjustor, and based on the policy data, a second policy that is scheduled for renewal;

determining, by the renewal adjustor, and based on the policy data, that a second advance renewal notice associated with the second policy was sent late by a second particular number of days;

determining, by the renewal adjustor, that an exception to an advance notice period applies to the second policy; and determining, by the renewal adjustor, not to modify the policy data associated with the second policy based on determining that the exception applies, wherein the exception is at least one of:

a first determination that an action of a policyholder associated with the second policy caused the second advance renewal notice to be sent late, or a second determination that a renewal premium of the second policy does not exceed a second current premium of the second policy by at least a threshold amount.

10. The computer-implemented method of claim 1, wherein the policy data indicates:

the current term of the policy, the current premium associated with the current term of the policy, the renewal term of the policy that is associated with the renewal of the policy, and the adjusted premium associated with the renewal term of the policy.

11. The computer-implemented method of claim 1, wherein the renewal adjustor comprises:

a plug-in to the policy management software application, an add-on to the policy management software application, or an element that executes separately from the policy management software application.

12. A computing system, comprising:
one or more processors, and
memory storing computer-executable instructions associated with a renewal adjustor that, when executed by the one or more processors, cause the renewal adjustor to:
  access a data repository associated with a policy management software application, wherein:
    the data repository stores policy data associated with policies, and
    premium information, in the policy data, is stored in a locked data format that blocks modification of the premium information associated with the policies after starting dates of the policies;
  identify, based on the policy data, a policy that is scheduled for renewal;
  determine that an advance notice period applies to the policy;
  determine, based on the advance notice period and an end date of a current term of the policy indicated by the policy data, a target date;
  determine, based on the policy data, that an advance renewal notice associated with the policy was sent late, after the target date, by a particular number of days, wherein:
    the advance renewal notice having been sent late by the particular number of days would cause an adjusted premium associated with a renewal term of the policy, following the current term of the policy, to go into effect after a starting date of the renewal term, and
    the policy management software application is configured, based on the locked data format, to block a change, after the starting date of the renewal term, to the premium information that would cause the adjusted premium to become effective after the starting date of the renewal term; and
  modify, in response to determining that the advance renewal notice was sent late by the particular number of days, the policy data to:
    extend the current term of the policy, associated with a current premium, by the particular number of days; and
    shorten the renewal term of the policy, associated with the adjusted premium, by the particular number of days,
    wherein modifying the policy data causes the policy management software application to delay the renewal of the policy, and delay the starting date of the renewal term, by the particular number of days.

13. The computing system of claim 12, wherein the computer-executable instructions further cause the renewal adjustor to:
  determine, based on the policy data, a jurisdiction associated with the policy; and
  identify the advance notice period from among a plurality of advance notice periods associated with different jurisdictions, based on the jurisdiction associated with the policy.

14. The computing system of claim 12, wherein the computer-executable instructions cause the renewal adjustor to determine that the advance notice period applies to the policy based on:
  determining a type of the policy; and
  determining that the advance notice period is applicable to the type of the policy.

15. The computing system of claim 12, wherein the computer-executable instructions further cause the renewal adjustor to:
  determine that an exception to the advance notice period does not apply to the policy based on:
    a company associated with the policy being at fault for sending the advance renewal notice late, and
    the policy data indicating that the adjusted premium associated with the renewal term exceeds the current premium associated with the current term by at least a threshold amount; and
  modify the policy data, to extend the current term and to shorten the renewal term, based on determining that the exception does not apply.

16. The computing system of claim 12, wherein the delay of the renewal of the policy, caused by modifying the policy data, causes the adjusted premium to go into effect on the starting date of the renewal term after the particular number of days has passed following an actual notice date when the advance renewal notice was sent.

17. One or more non-transitory computer-readable media storing computer-executable instructions associated with a renewal adjustor that, when executed by one or more processors of a computing system, cause the renewal adjustor to:
  access a data repository associated with a policy management software application, wherein:
    the data repository stores policy data associated with policies, and
    premium information, in the policy data, is stored in a locked data format that blocks modification of the premium information associated with the policies after starting dates of the policies;
  identify, based on the policy data, a policy that is scheduled for renewal;
  determine that an advance notice period applies to the policy;
  determine, based on the advance notice period and an end date of a current term of the policy indicated by the policy data, a target date;
  determine, based on the policy data, that an advance renewal notice associated with the policy was sent late, after the target date, by a particular number of days, wherein:
    the advance renewal notice having been sent late by the particular number of days would cause an adjusted premium associated with a renewal term of the policy, following the current term of the policy, to go into effect after a starting date of the renewal term, and
    the policy management software application is configured, based on the locked data format, to block a change, after the starting date of the renewal term, to the premium information that would cause the adjusted premium to become effective after the starting date of the renewal term; and
  modify, in response to determining that the advance renewal notice was sent late by the particular number of days, the policy data to:
    extend the current term of the policy, associated with a current premium, by the particular number of days; and
    shorten the renewal term of the policy, associated with the adjusted premium, by the particular number of days,
    wherein modifying the policy data causes the policy management software application to delay the renewal of the policy, and delay the starting date of the renewal term, by the particular number of days.

18. The one or more non-transitory computer-readable media of claim 17, wherein the computer-executable instructions further cause the renewal adjustor to:
determine, based on the policy data, a jurisdiction associated with the policy; and
identify the advance notice period from among a plurality of advance notice periods associated with different jurisdictions, based on the jurisdiction associated with the policy.

19. The one or more non-transitory computer-readable media of claim 17, wherein the computer-executable instructions further cause the renewal adjustor to:
determine that an exception to the advance notice period does not apply to the policy based on:
a company associated with the policy being at fault for sending the advance renewal notice late, and
the policy data indicating that the adjusted premium associated with the renewal term exceeds the current premium associated with the current term by at least a threshold amount; and
modify the policy data, to extend the current term and to shorten the renewal term, based on determining that the exception does not apply.

20. The one or more non-transitory computer-readable media of claim 17, wherein the delay of the renewal of the policy, caused by modifying the policy data, causes the adjusted premium to go into effect on the starting date of the renewal term after the particular number of days has passed following an actual notice date when the advance renewal notice was sent.

* * * * *